United States Patent
Hart et al.

(10) Patent No.: US 10,312,979 B2
(45) Date of Patent: Jun. 4, 2019

(54) ENABLING DISTRIBUTED ACCESS POINTS ON HIGH BANDWIDTH CABLES FOR BAND AND ANTENNA SPLITTING

(71) Applicant: Cisco Technology, Inc., San Jose, CA (US)

(72) Inventors: Brian D. Hart, Sunnyvale, CA (US); Paul J. Stager, Akron, OH (US); David Kloper, Santa Clara, CA (US); Jie Cheng Jiang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 211 days.

(21) Appl. No.: 15/220,701

(22) Filed: Jul. 27, 2016

(65) Prior Publication Data

US 2018/0034517 A1 Feb. 1, 2018

(51) Int. Cl.
*H04W 72/04* (2009.01)
*H04B 7/0452* (2017.01)
*H04B 7/024* (2017.01)
*H04W 84/12* (2009.01)
*H04W 88/08* (2009.01)

(52) U.S. Cl.
CPC .......... *H04B 7/0452* (2013.01); *H04B 7/024* (2013.01); *H04W 84/12* (2013.01); *H04W 88/08* (2013.01)

(58) Field of Classification Search
CPC ....... H04L 2025/03426; H04L 27/2601; H04L 27/06
See application file for complete search history.

(56) References Cited

U.S. PATENT DOCUMENTS 5,425,000 A 6/1995 Reed et al.
7,277,679 B1 * 10/2007 Barratt .................. H04B 7/084
375/347

(Continued)

OTHER PUBLICATIONS

Balan, et al., "AirSync: Enabling Distributed Multiuser MIMO with Full Spatial Multiplexing," IEEE/ACM Transactions on Networking, Jul. 2012, pp. 1-15.

(Continued)

*Primary Examiner* — Romani Ohri
(74) *Attorney, Agent, or Firm* — Edell, Shapiro & Finnan, LLC

(57) ABSTRACT

A wireless access point device wirelessly communicates with a plurality of wireless client devices. The wireless access point includes a central processor subsystem and a plurality of transceiver devices each including a plurality of antennas, and a plurality of radio transceivers, each of the plurality of transceiver devices configured for deployment throughout a coverage area, each transceiver device being connected to the central processor subsystem via a respective cable. The central processor subsystem distributes in-phase and quadrature baseband samples across the plurality of transceiver devices associated with traffic to be transmitted and received via the plurality of transceiver devices in one or more frequency bands so as to synthesize a wideband multiple-input multiple-output transmission channel and a wideband multiple-input multiple-output reception channel. The access point transmit and receive functions are "split" or partitioned across the plurality of transceivers devices.

20 Claims, 10 Drawing Sheets

(56) References Cited

U.S. PATENT DOCUMENTS

| | | |
|---|---|---|
| 7,522,669 B2 | 4/2009 | Husted et al. |
| 7,945,005 B2 | 5/2011 | Le Saux et al. |
| 8,391,374 B2 | 3/2013 | Husted et al. |
| 8,676,144 B2 | 3/2014 | Guo et al. |
| 8,744,504 B2 | 6/2014 | Faccin et al. |
| 8,842,606 B2 | 9/2014 | Denteneer et al. |
| 8,885,453 B2 | 11/2014 | Stager |
| 9,241,275 B2 | 1/2016 | Kloper et al. |
| 2008/0080631 A1 | 4/2008 | Forenza et al. |
| 2008/0118004 A1 | 5/2008 | Forenza et al. |
| 2008/0130790 A1 | 6/2008 | Forenza et al. |
| 2009/0067402 A1 | 3/2009 | Forenza et al. |
| 2009/0256596 A1* | 10/2009 | Oh .............. G06F 7/68 327/115 |
| 2010/0040011 A1* | 2/2010 | Kang ............ H04W 76/048 370/329 |
| 2010/0172309 A1 | 7/2010 | Forenza et al. |
| 2010/0316163 A1 | 12/2010 | Forenza et al. |
| 2011/0002371 A1 | 1/2011 | Forenza et al. |
| 2011/0002410 A1 | 1/2011 | Forenza et al. |
| 2011/0002411 A1 | 1/2011 | Forenza et al. |
| 2011/0003606 A1 | 1/2011 | Forenza et al. |
| 2011/0003607 A1 | 1/2011 | Forenza et al. |
| 2011/0003608 A1 | 1/2011 | Forenza et al. |
| 2011/0044193 A1 | 2/2011 | Forenza et al. |
| 2011/0149882 A1 | 6/2011 | Gong et al. |
| 2011/0222460 A1 | 9/2011 | Fahldieck |
| 2012/0015653 A1* | 1/2012 | Paliwal ............ H04W 24/10 455/435.1 |
| 2012/0087430 A1 | 4/2012 | Forenza et al. |
| 2012/0093078 A1 | 4/2012 | Perlman et al. |
| 2012/0196591 A1* | 8/2012 | O'Keeffe .......... H01Q 1/246 455/427 |
| 2012/0314570 A1 | 12/2012 | Forenza et al. |
| 2013/0034130 A1 | 2/2013 | Forenza et al. |
| 2013/0039168 A1* | 2/2013 | Forenza ............ H04B 7/022 370/221 |
| 2013/0039345 A1* | 2/2013 | Kim ............... H04W 72/046 370/332 |
| 2013/0301471 A1 | 11/2013 | Brown |
| 2014/0071955 A1 | 3/2014 | Du et al. |
| 2014/0211779 A1 | 7/2014 | Caire et al. |
| 2014/0241240 A1 | 8/2014 | Kloper et al. |
| 2015/0023248 A1 | 1/2015 | Sundaresan et al. |
| 2016/0242130 A1* | 8/2016 | Moon .............. H04B 7/155 |
| 2017/0367277 A1* | 12/2017 | Mohindra .......... A01G 22/00 |
| 2018/0007664 A1* | 1/2018 | Gho ............. H04W 72/042 |
| 2018/0098376 A1* | 4/2018 | Jang ............. H04W 76/046 |

OTHER PUBLICATIONS

Balan, et al., "Distributed Multiuser MIMO with Full Spatial Multiplexing," Ming Hsieh Institute, Mar. 12, 2012, pp. 1-2.

Murakami, et al., "Performance Evaluation of Distributed Multi-cell Beamforming for MU-MIMO Systems," 8th International Symposium on Wireless Communication Systems, 2011, pp. 547-551.

Bejarano et al., "Scaling Multi-User MIMO WLANs: The Case for Concurrent Uplink Control Messages", IEEE International Conference on Sensing, Communication, and Networking, Jun. 22-25, 2015, 9 pages.

Favalli et al., "Frequency Domain Estimation and Compensation of Intercarrier Interference in OFDM Systems", Spread Spectrum Techniques and Applications, ISSSTA '08. IEEE 10th International Symposium on, Sep. 2008 pp. 470-474, 5 pages.

* cited by examiner

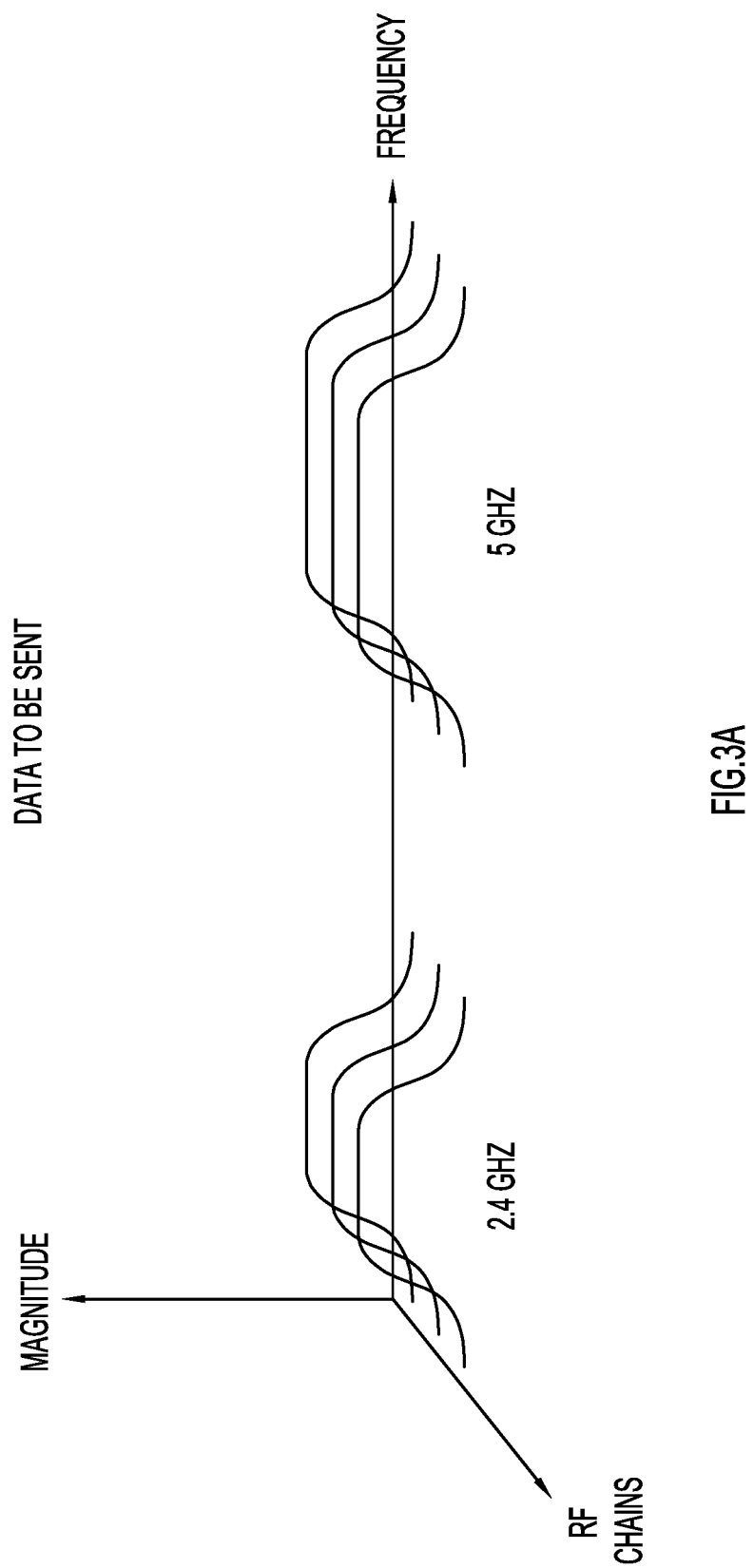

ENABLING DISTRIBUTED ACCESS POINTS ON HIGH BANDWIDTH CABLES FOR BAND AND ANTENNA SPLITTING

TECHNICAL FIELD

The present disclosure relates to wireless communications.

BACKGROUND

Distributed Multi-User Multiple-Input Multiple-Output (MU-MIMO) is an attractive technology for achieve more parallelism of transmissions and fewer collisions. Almost inevitably, distributed Uplink MU-MIMO (UL-MU-MIMO) for, uncoordinated systems, such as Wi-Fi®, requires that raw samples be fronthauled to a centralized baseband processor. Distributed Downlink MU-MIMO (DL-MU-MIMO) can work in the same way.

Lighting-as-a-Service (LaaS) offers dense ceiling cabling that is useful for distributed MU-MIMO. Due to cost pressures, 1 Gigabit Ethernet (1 GigE), as opposed to Multi-gigabit (MGig) and 10G, is likely to dominate the options for cabling for LaaS in other similar systems.

Despite compression, with control signals etc., approximately 20 bits per in-phase (I) and quadrature (Q) sample is a reasonable estimate for data to be transmitted and/or received. Thus, a 1 GigE cable can carry 2*20 MHz (800 Mbps) of traffic with some margin. However, this is not enough bandwidth for modern Wi-Fi systems that can operate as high as 4*80 MHz. Similarly, 4*160 MHz Wi-Fi traffic cannot be supported by 10 GigE.

A way is needed to synthesize larger bandwidths of data over cables that have relatively low capacity.

BRIEF DESCRIPTION OF THE DRAWINGS

FIG. 3A illustrates an example of data to be transmitted, according to an example embodiment.

DESCRIPTION OF EXAMPLE EMBODIMENTS

Overview

In accordance with one embodiment, at a wireless access point device wirelessly communicates with a plurality of wireless client devices. The wireless access point includes a central processor subsystem and a plurality of transceiver devices each including a plurality of antennas, a plurality of radio transmitters and a plurality of radio transceivers, each of the plurality of transceiver devices for deployment throughout a coverage area, each transceiver device being connected to the central processor subsystem via a respective cable. The central processor subsystem distributes in-phase and quadrature baseband samples across the plurality of transceiver devices associated with traffic to be transmitted and received via the plurality of transceiver devices in one or more frequency bands so as to synthesize a wideband multiple-input multiple-output transmission channel and a wideband multiple-input multiple-output reception channel. Respective ones of in-phase and quadrature baseband transmit samples are coupled from the central processor subsystem to a corresponding cable to be sent to a corresponding one of the plurality of transceiver devices for wireless transmission via the plurality of antennas of each of the plurality of transceiver devices. Similarly, respective ones of in-phase and quadrature baseband receive samples are coupled from a respective one of the plurality of transceiver devices to the corresponding cable to be sent to the central processor subsystem.

Example Embodiments

Consider a multiband MIMO access point (AP) that supports N(band) radio frequency (RF) transceiver chains spanning B(band) MHz Basic Service Sets (BSSs), where N(band) denotes that the number of RF transceiver chains may be different for different frequency bands of operation, and similarly B(band) denotes that the bandwidth may be different depending on the frequency band of operation, e.g., 2.4 GHz versus 5 GHz. A compression scheme may involve b bits per in-phase and quadrature (IQ or I/Q) sample (including embedded control overheads). Ethernet cabling supports E Mbps. A fronthaul to the AP needs to carry $\Sigma_{band}N(band)*B(band)*b$, but if $\Sigma_{band}N(band)*B(band)*b > E$ then the data cannot be sent over the Ethernet cable. For example, a single band (e.g., 2.4 GHz or 5 GHz), N=4, B=80, b=20, E=1000. Thus, the IQ baseband transmit samples are compressed prior to being coupled to respective ones of the cables.

To meet this challenge, according to the embodiments presented herein, the AP transmit and receive functions are "split" or partitioned across R transceivers called "radio heads." As a result, the fronthaul is expanded R times (since there are R number of cables), and R is chosen such that N*B*b is less than or equal to R*E. The data rate supported by the cabling, E, need not be fixed and may be asymmetric (for uplink versus downlink) such that the sum of the data rate E achieves a goal for uplink and downlink, respectively.

Figure 1:
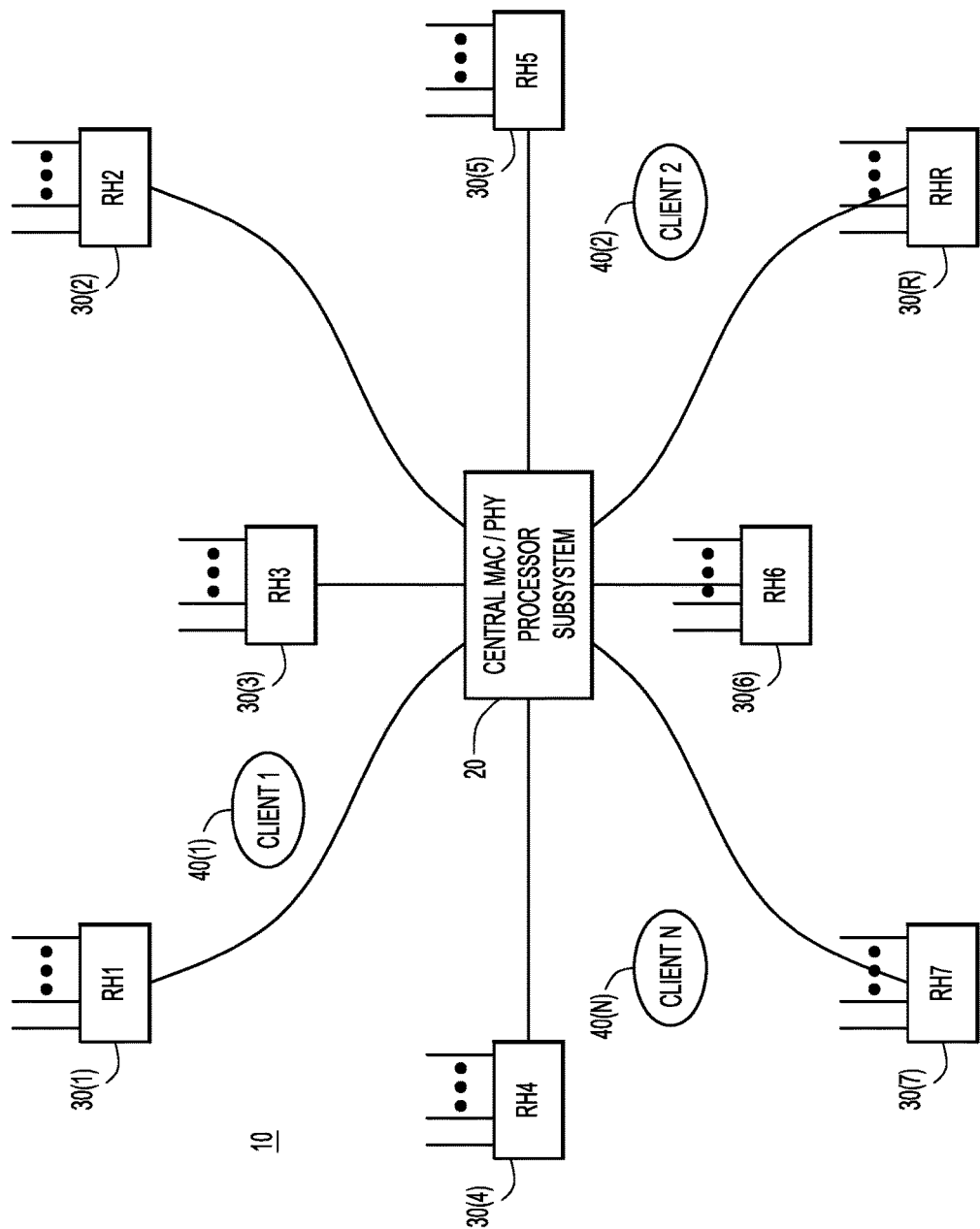
FIG. 1 is a block diagram of a distributed multi-user multiple-input multiple-output (MU-MIMO) system in which a wideband transmission channel and wideband reception channel are synthesized, according to an example embodiment.

With reference made to FIG. 1, a system 10 is shown that includes a central media access control/PHY processor subsystem 20 connected to or in communication with a plurality of radio heads (RHs) 30(1)-30(R) physically separated from each other and arranged to wirelessly communicate with one or more wireless client devices, e.g., clients 40(1)-40(N). The RHs are also referred to herein as "transceiver devices.

As described in more detail hereinafter in connection with FIG. 1, each RH includes one or more antennas, a downconverter for each antenna, an upconverter for each antenna, an automatic gain control circuitry/functionality. As a result, each RH can generate multiple receive signals, one detected by each antenna, associated with a transmission made by a client device. In addition, each RH can transmit multiple signals, each via a corresponding transmitter and antenna path, using MU-MIMO techniques, for example.

Figure 2:
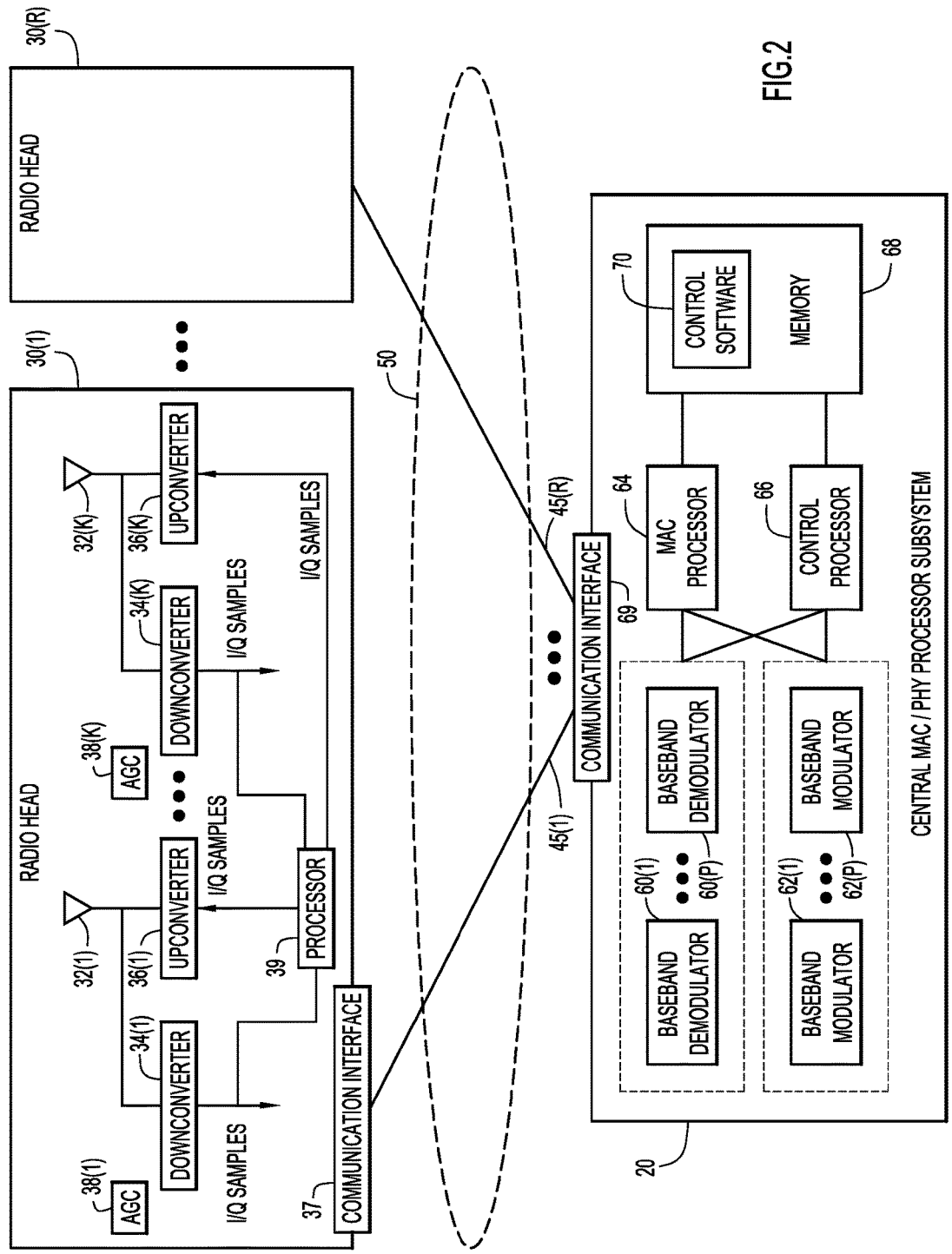
FIG. 2 is a more detailed block diagram of the system shown in FIG. 1, according to an example embodiment.

Reference is now made to FIG. 2. FIG. 2 shows the RHs and the central MAC/PHY processor subsystem in more detail, according to an example embodiment. For generality, a plurality of RHs 30(1)-30(N) is shown connected to the central MAC/PHY processor subsystem 20.

Each RH includes a plurality of antennas 32(1)-32(K), a corresponding plurality of downconverters 34(1)-34(K), a corresponding plurality of upconverters 36(1)-36(K) and a corresponding plurality of AGC blocks 38(1)-38(K) (or one AGC block shared across all of the antenna paths). Each downconverter 34(1)-34(K) generates downconverted I/Q samples of a signal received at its associated antenna, which are sent over the fronthaul network 50 to the central MAC/PHY processor subsystem 20. Each upconverter 36(1)-36(K) upconverts I/Q transmit signals (received from the central MAC/PHY processor subsystem 20 via the fronthaul network 50) for transmission via its associated antenna. An analog-to-digital converter (ADC) may be included in or associated with each downconverter 34(1)-34(K), though not shown in FIG. 2 for simplicity. Likewise, a digital-to-analog converter (DAC) may be included in or associated with each upconverter 36(1)-36(K). There also is a communication interface 37 in each RH that coordinates communication of signals (in both directions) over a cable to the central MAC/PHY processor subsystem 20. In the case that the cable is an Ethernet cable, then the communication interface 37 is an Ethernet network interface card.

In addition, each RH may include a processor 39 that is coupled to each of the downconverters 34(1)-34(K) to perform signal processing on the downconverted samples produced by the downconverters. The processor 39 may be a digital signal processor, an application specific integrated circuit (ASIC) including digital logic gates, a programmable digital logic, or a microprocessor or microcontroller that executes instructions stored in memory to carry out various signal processing operations. The processor 39 may similarly perform signal processing on the upconverted samples.

The central MAC/PHY processor subsystem 20 includes a bank of baseband demodulators 60(1)-60(P), a bank of baseband modulators 62(1)-62(P), a MAC processor 64, a control processor 66, and memory 68. The MAC processor 64 and control processor 66 are each connected to the bank of baseband demodulators 60(1)-60(P) and to the bank of baseband modulators 62(1)-62(P). The baseband demodulators 60(1)-60(P) perform baseband demodulation processing on the downconverted I/Q samples received from the antenna paths of the RHs. The baseband modulators 62(1)-62(P) perform baseband modulation processing to generate I/Q transmit signals to be supplied to each upconverter of each antenna path of each RH. The MAC processor 64 performs media access control processing. The control processor 66 performs a variety of other functions by executing instructions associated with the control software 70 stored in memory 68. In one form, one or more of the baseband demodulators, baseband modulators, MAC processor 64 and control processor 66 may be implemented in one or more ASICs, digital signal processors, programmable digital logic gates, etc. There is also a communication interface 69 that enables communication, in both directions, between the central MAC/PHY subsystem 20 and each RH 30(1)-30(R).

The memory 68 may include read only memory (ROM), random access memory (RAM), magnetic disk storage media devices, optical storage media devices, flash memory devices, electrical, optical, or other physical/tangible memory storage devices. Thus, in general, the memory 68 may comprise one or more tangible (non-transitory) computer readable storage media (e.g., a memory device) encoded with software comprising computer executable instructions and when the software is executed (by the processor 65) it is operable to perform the operations described herein.

Downlink signals to be transmitted are sent from the central MAC/PHY processor subsystem to Each RH 30(1)-30(R) via a corresponding one or more of the cables 45(1)-45(R). The I/Q samples associated with uplink signals detected by each antenna of an RH are sent over a corresponding subset of the cables 45(1)-45(R) to the central MAC/PHY processor subsystem 20.

In addition, the RHs share a clock and are RF synchronized. The combination of the central MAC/PHY processor subsystem 20 and the plurality of RHs 30(1)-30(R) form a distributed multi-user-MIMO system when communicating with multiple client devices simultaneously, as described further hereinafter.

Presented herein are techniques to distribute I-Q samples from multiple frequency bands for multiple antennas via multiple cables to synthesize a wideband MIMO signal (for both uplink and downlink). This presupposes a direct or very low latency copper cable (or optical cable) connection to transport baseband modulation waveforms (I-Q samples), rather than general purpose data, between the central entity, e.g., the central MAC/PHY processing subsystem 20 and the RHs 30(1)-30(R). The distance between the central MAC/PHY processing subsystem 20 and the RHs 30(1)-30(R) may be approximately 1 to 100 meters (or more). The RHs may be a meter and typically up to 10-15 meters apart. To promote flexible processing across RHs, the modulation waveform, comprising a continuous stream of IQ samples, may be compressed before coupled to the respective cable. For example, the stream of IQ samples may be divided into equal-length time division multiplexed (TDM) windows (e.g. containing 50 ns of samples) and aggregated into equal length MAC Service Data Units (MSDUs) (e.g. containing 24 μs of samples) before transmission as distinct equal-length frames over the Ethernet link.

Traffic Divided by Bands

Figure 3B:
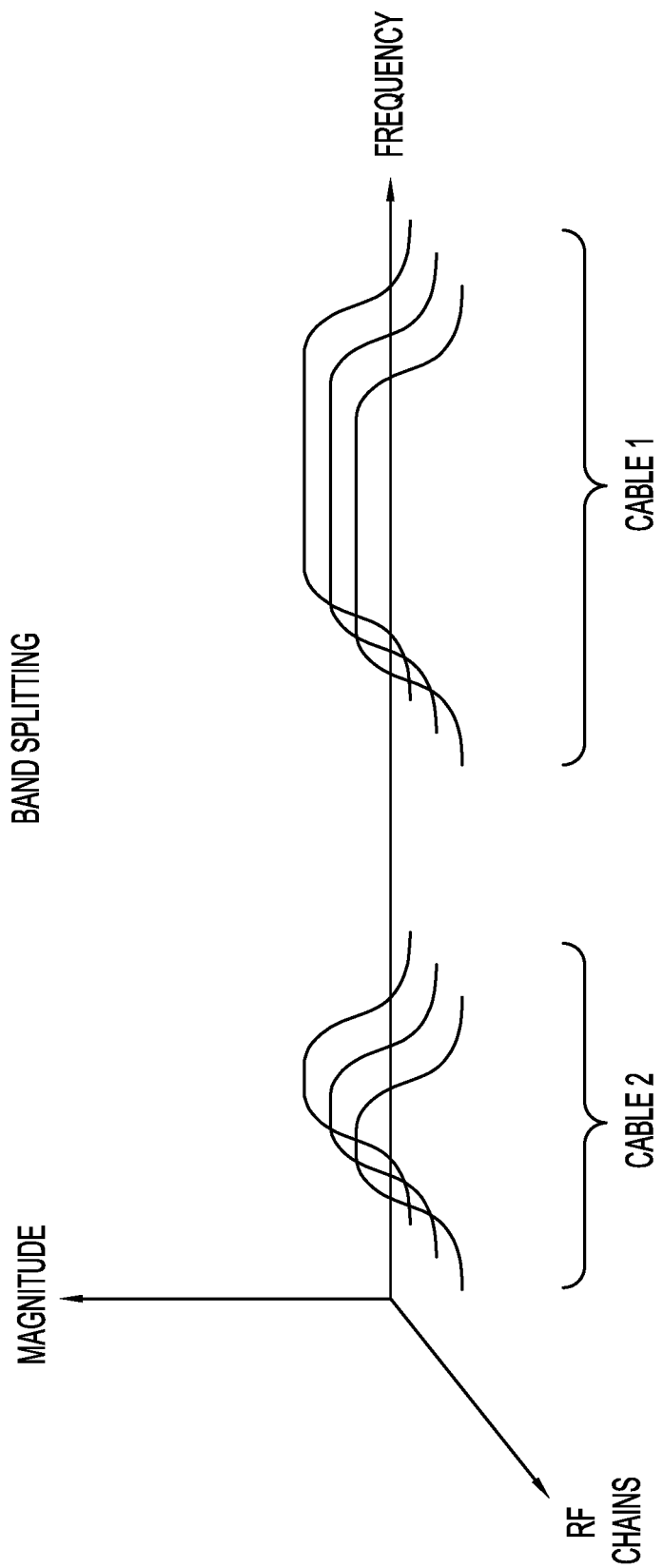
FIG. 3B illustrates synthesizing a wideband MIMO channel by splitting transmit or receive data across frequency bands, according to an example embodiment.

Reference is now made to FIGS. 3A and 3B. If N(band)*B(band)*b is less than or equal to E, then the traffic can be divided by bands as shown in FIG. 3A. For example, as shown in FIG. 3B, traffic for a first band (e.g., 5 GHz traffic) is sent over a first fronthaul Ethernet cable, Cable 1, from the MAC/PHY processor subsystem 20 to the a first RH, and traffic for a second band (e.g., 2.4 GHz traffic) is sent over a second fronthaul Ethernet cable, Cable 2, from the MAC/PHY processor subsystem 20 to a second RH.

Traffic Divided by Antenna Paths/RF Chains

Figure 3C:
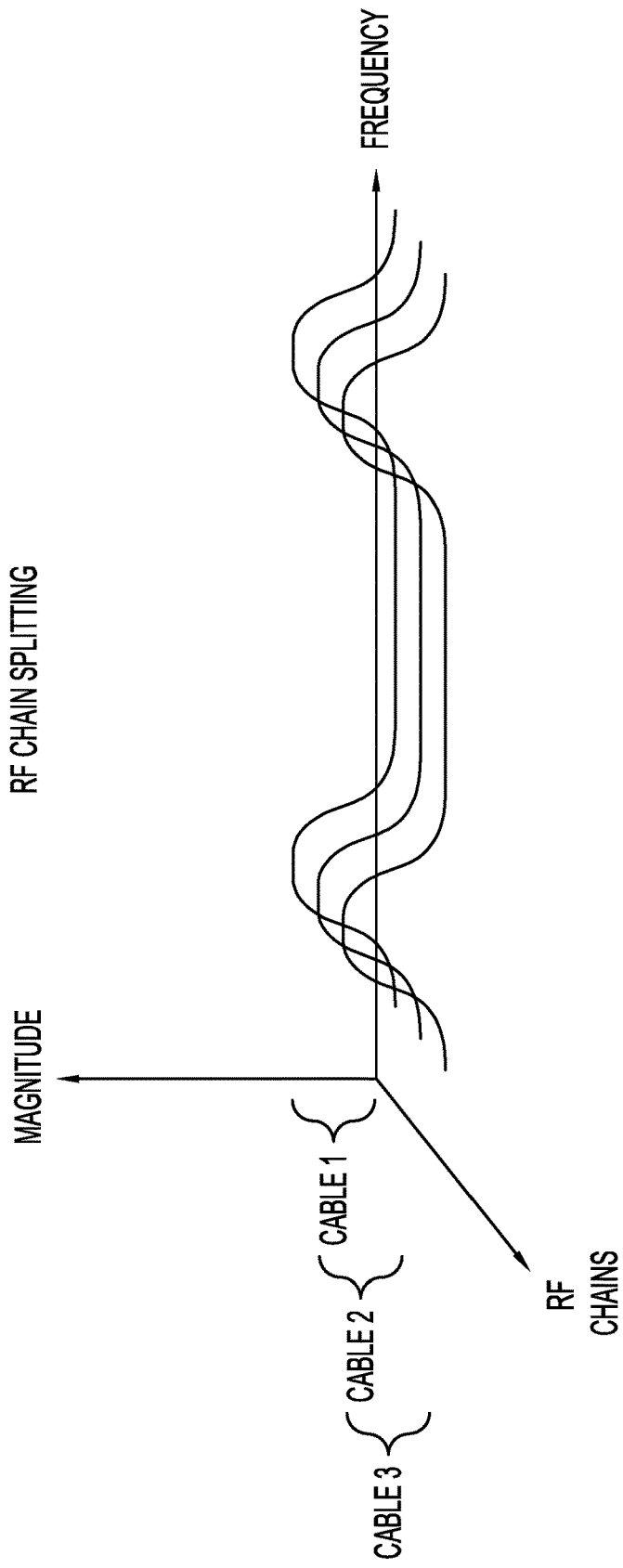
FIG. 3C illustrates synthesizing a wideband MIMO channel by splitting transmit or receive data across transceiver chains/antenna paths, according to an example embodiment.

Reference is now made to FIG. 3C. If B(band)*b is less than or equal to E, then the N(band)*B(band)*b traffic can be divided by antenna(s)/RF chain(s). Thus, a first cable, Cable 1, carries traffic for a first antenna path/RF chain, a second cable, Cable 2, carries traffic for a second antenna path/RF chain, a cable, Cable 3, carries traffic for a third antenna path/RF chain, and so on. For example, for a single band, N=4, B=20, b=20, E=1000, there are two RH's and each RH has two antennas, and two cables each carry 2*20 MHz of traffic to the two RHs that may be somewhat closely separated from each other, but from an RF perspective, better MIMO separation will be achieved.

Traffic Divided by Subbands

In accordance with a further embodiment, when B(band)*b is greater than E (but in other cases as well), the traffic may be divided into subbands and only a subband portion (in frequency) of the entire band of the signal is sent to respective ones of each of the plurality of RHs. Even when B(band)*b is less than E, this could have significant unused bandwidth and more antenna paths can be synthesized by dividing one or more paths into subbands. The division might be by subcarriers (Fast Fourier Transform/Inverse Fast Fourier Transform, (FFT/IFFT)), or a filter whose shifts sum to a flat response in the linear domain (e.g., raised cosine, etc.) or a filter whose shifts sum to a flat response in the power domain (e.g., square-root raised cosine, etc.). A goal is that the combination of signals combine over the air (in the downlink) and can be combined in the baseband processor (in the uplink) to create a simulacrum of a full bandwidth signal. The uplink may look very different since the centralized baseband processor subsystem can be aware of the splitting.

The filtering typically adds a transition band (excess bandwidth) of, for example, e MHz where e/B is typically 5-50% (e.g. 25%), and need not be the same for each antenna path. The initial formula changes to:

$$\sum_{band} N(\text{band}) * B(\text{band}) * e(\text{band}) \Big) * b$$

The downlink will appear like complicated multipath only to the client device since the client is, in many cases, not aware of the splitting.

For example, for a single band, N=3, B=80, b=20, E=1000, 9 Ethernet cables each carrying 1*(B=26.67 MHz+ e=13.33 MHz) is a solution.

Figure 4:
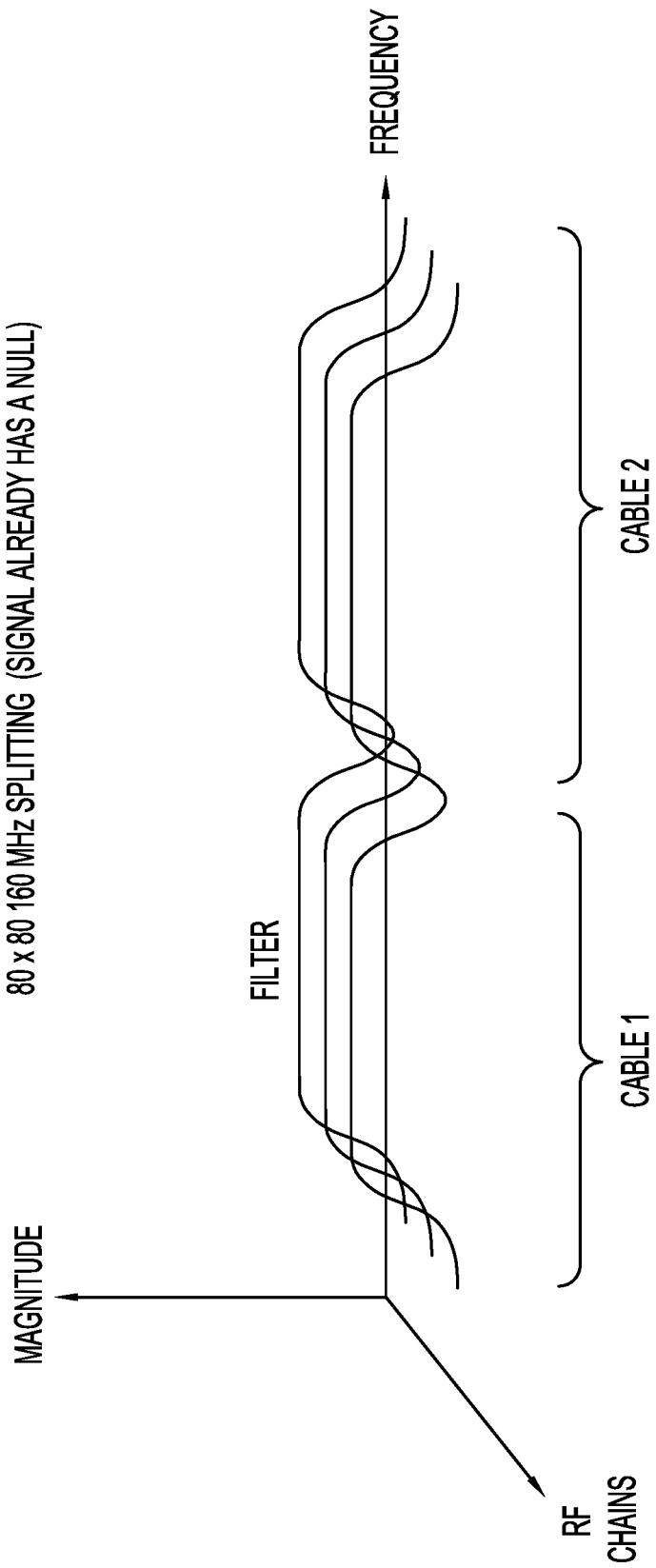
FIG. 4 illustrates a filter pair and the Power Spectral Density of a 160 MHz IEEE 802.11ac signal where the filter can split the signal into two subbands, according to an example embodiment.

There is one simplified case. Reference is made to FIG. 4. For IEEE 802.11ac, 160 MHz and 80+80 MHz are defined by the standard as being constructed from separate RF chains, each of 80 MHz. Mismatched multipath/phase noise is to be expected by the client. In this case, a 4*160 MHz or 4*(80+80) MHz AP may be formed/synthesized from two RHs, each 4*80 MHz. In this case, the fronthaul consists of (R=2) typically paired with E=10000) Mbps cables, shown as Cables 1 and 2 in FIG. 4.

Frequency Band and RF Chain Splitting

Figure 5:
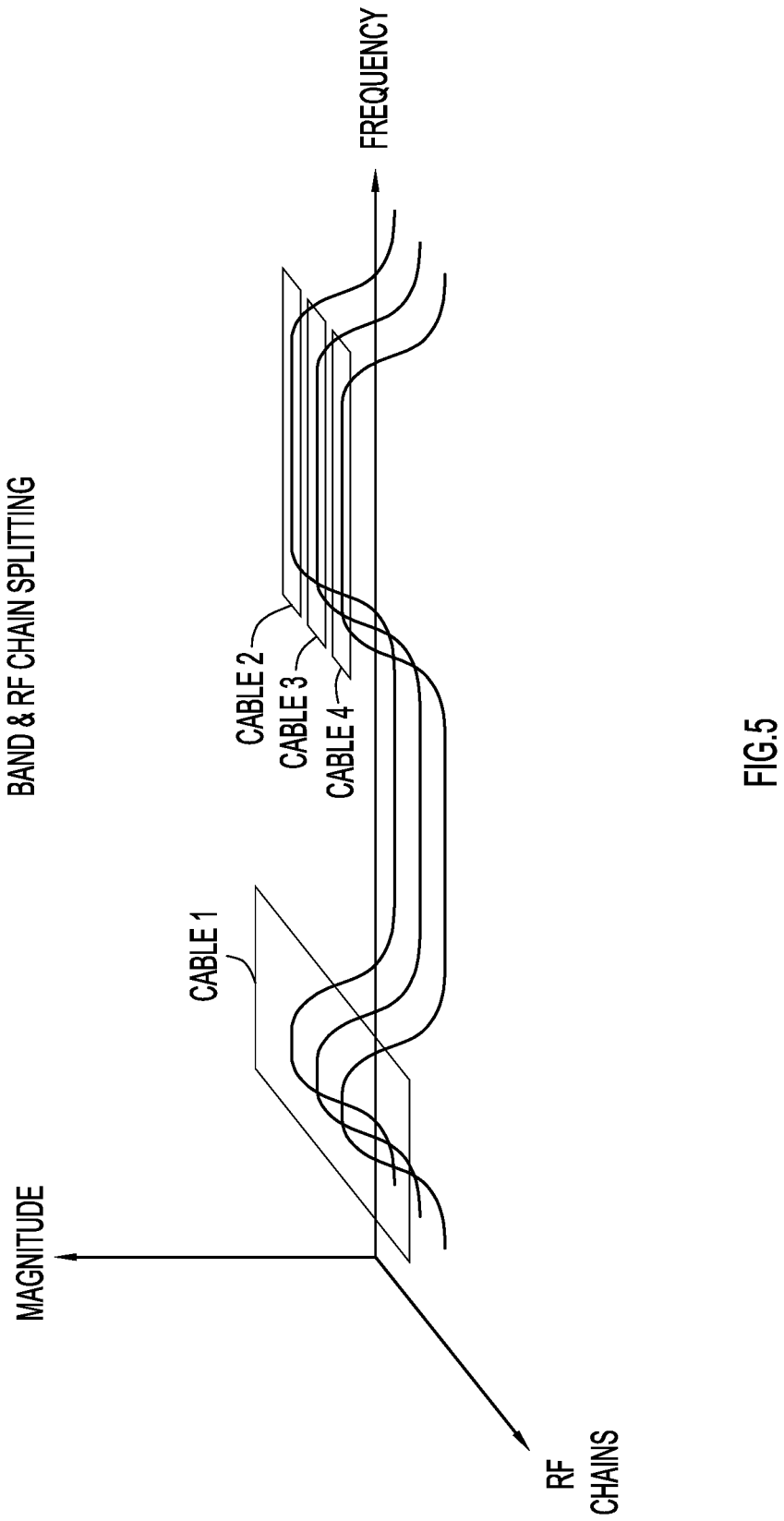
FIG. 5 illustrates synthesizing a wideband MIMO channel by splitting transmit or receive data by frequency band and transceiver chains/antenna paths, according to an example embodiment.

The foregoing techniques may be combined. For example, FIG. 5 shows a combination of band splitting and RF (transceiver) chain splitting. In this example, a first cable, Cable 1, would carry traffic in a first band across RF chains; a second cable, Cable 2, carries traffic in a second band for a first RF chain; a third cable, Cable 3, carries traffic in the second band for a second RF chain, and a fourth cable, Cable 4, carries traffic in the second band for a third RF chain.

Frequency Band, RF Chain and Subband Filtering Splitting

Figure 6:
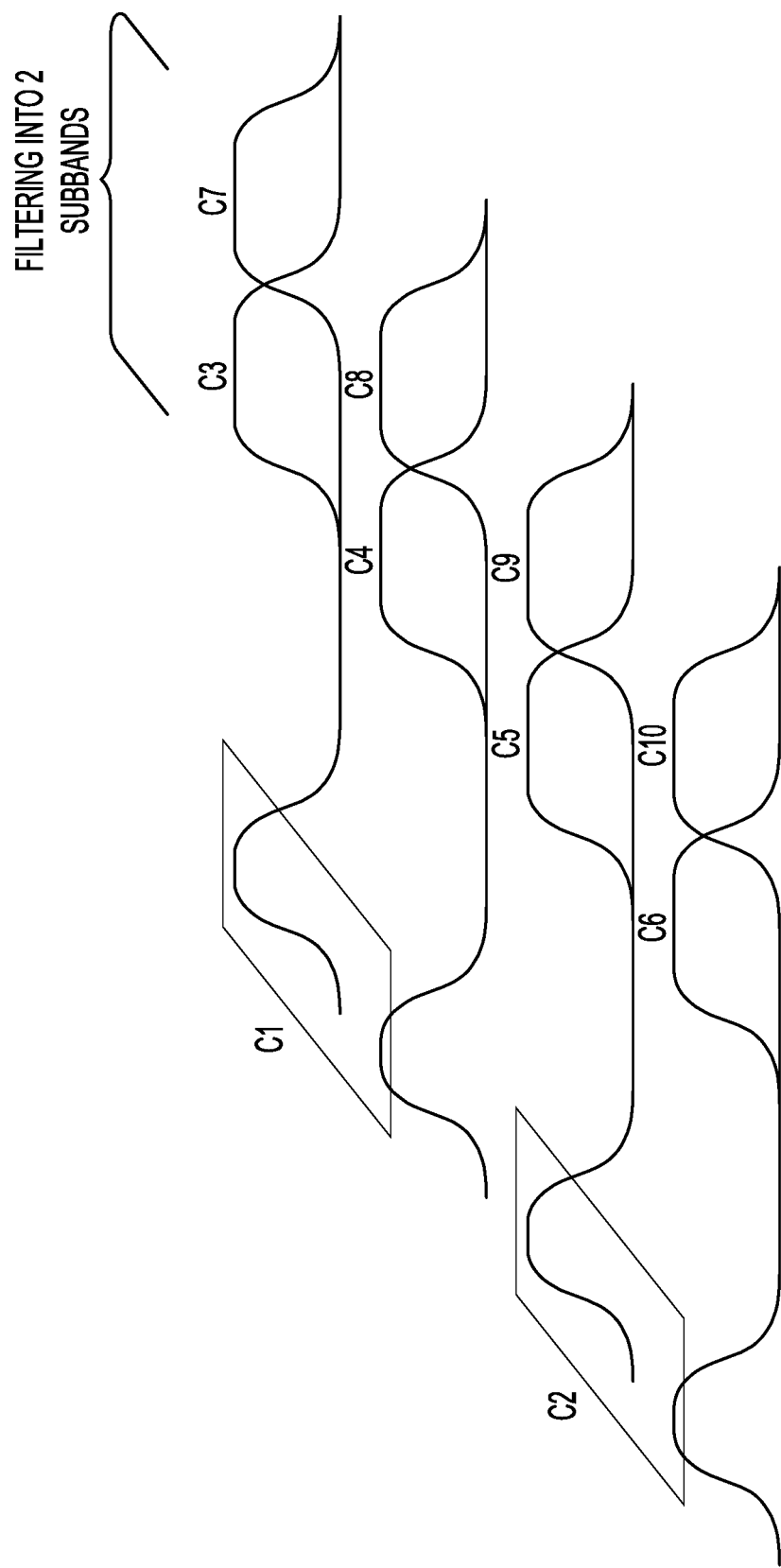
FIG. 6 illustrates synthesizing a wideband MIMO channel by splitting transmit or receive data by frequency band, transceiver chains/antenna paths and subbands, according to an example embodiment.

FIG. 6 illustrates an example combination of band, RF chain and filtering splitting. In this example, 10 cables are used, denoted $C_1$-$C_{10}$ and N=4 (four RF chains). Cable $C_1$ carries traffic in a first band across two RF chains, and cable $C_2$ carries traffic in the first band across the two other RF chains. The first band is, for example, the 2.4 GHz band. A second band, e.g., the 5 GHz band, is partitioned into first and second subbands using filtering techniques described above in connection with FIG. 4. Specifically, cables $C_3$-$C_6$ carry traffic in the first subband for respective ones of the four RF chains. Similarly, cables $C_7$-$C_{10}$ carry traffic in the second subband for respective ones of the four RF chains.

Figure 7:
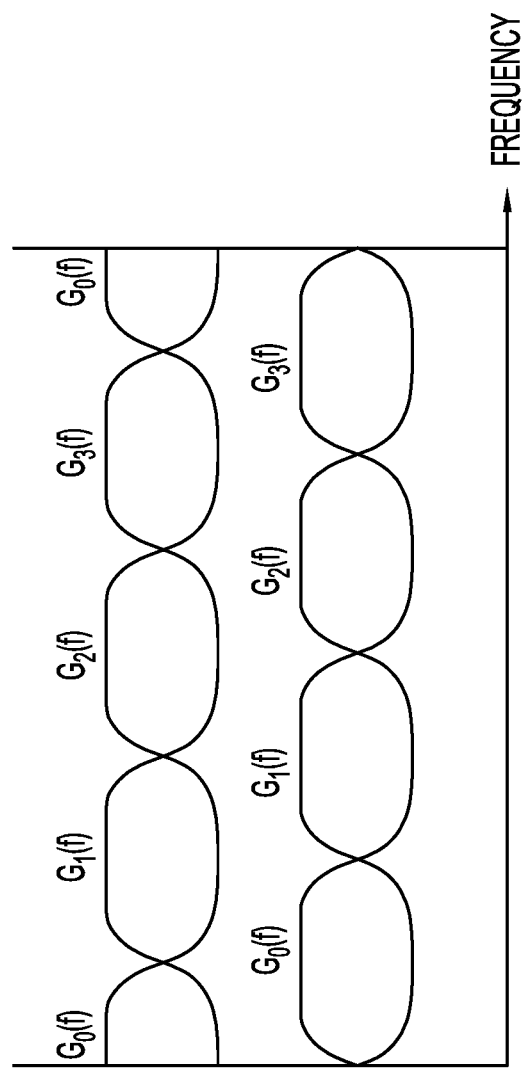
FIG. 7 shows the transfer functions of two example filter banks, where each filter bank can split a signal into 4 subbands, according to an example embodiment.

As shown in FIG. 7, the filter to achieve the splitting arrangement depicted in FIG. 6 has a property that:

$$G_1(f)+G_2(f)+ \ldots =1; \text{ or}$$

$$|G_1(f)|^2+|G_2(f)|^2+ \ldots =1.$$

As explained above, the RHs are synchronized. This may be achieved by using a common oscillator at the centralized MAC/PHY processor subsystem 20 that drives the Ethernet communications (even in the absence of packets) to the RHs, and each RH recovers that clock and uses a cleaned-up version of it for its PHY communications. (e.g., via a phase lock loop).

Variations are envisioned of the techniques presented above. First, rather than transmitting using a fixed subband, selection diversity may be used to determine the strongest subband per antenna. This may be used to latch at start-of-PPDU (SOP) upon reception, and the transmitter would cache the best subband per antenna per client and send downlink data only on the antennas/RF chains that strongly received a packet. This allows for dynamic selection, such as selecting between 4*40 MHz, 2*80 MHz and 1*160 MHz.

Second, a transmission may be sent on one antenna for a full band and selection diversity is used on other antennas, so that a full bandwidth is obtained for at least one antenna per RH. Moreover, the full band antenna path may use fixed or selection diversity as described above.

Thus, selection diversity may be used across the plurality of RHs to determine on which transceiver chain to transmit for a given subband. Moreover, one or more transceiver chains for an entire frequency band may be selected and selection diversity is used on all other transceiver chains so that a full bandwidth of a frequency band is used for at least one transceiver chain for at least one RH.

Further still, a smaller set of subbands may be established, and channel state information (CSI) for all paths are latched at start-of-packet, and "trickled up" CSI for all antenna paths for better sounding of the channel upon transmission, even if a current packet is being decoded using a subset of all the antenna paths. This allows for selecting a subband for each antenna for a given client. That is, channel state information may be sent to the central MAC/PHY processor subsystem for all or a subset of all antennas of a given RH or all or a subset of all transceiver chains even if a current received packet is being decoded using a subset of all the transceiver chains.

Figure 8:
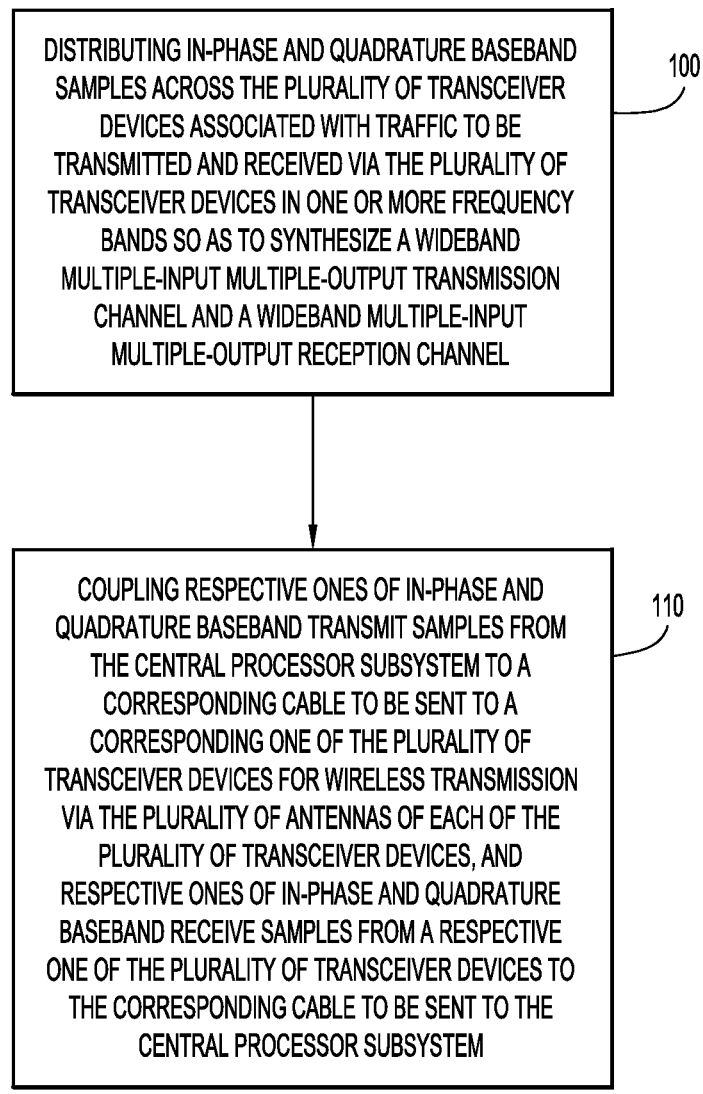
FIG. 8 is a flow chart depicting, at a high-level, the processing performed to synthesize a wideband MIMO channel, according to an example embodiment.

Reference is now made to FIG. 8 for a comprehensive high-level depiction of the processing performed to achieve the various embodiments described above. Reference is made to FIGS. 1 and 2 in connection with this description. These operations are performed at a wireless access point device that wirelessly communicates with a plurality of wireless client devices. The wireless access point includes a central processor subsystem and a plurality of transceiver devices each including a plurality of antennas and a plurality of radio transceivers, each of the plurality of transceiver devices positioned spaced from each other throughout a coverage area, each transceiver device being directly connected to the central processor subsystem via a respective cable. At 100, the central processor subsystem distributing in-phase and quadrature baseband samples across the plurality of transceiver devices associated with traffic to be transmitted and received via the plurality of transceiver devices in one or more frequency bands so as to synthesize a wideband multiple-input multiple-output transmission channel and a wideband multiple-input multiple-output reception channel.

At 110, for the wideband multiple-input multiple-output transmission channel on the downlink, respective ones of in-phase and quadrature baseband transmit samples are coupled from the central processor subsystem to a corresponding cable to be sent to a corresponding one of the plurality of transceiver devices for wireless transmission via the plurality of antennas of each of the plurality of transceiver devices. In addition, for the wideband multiple-input multiple-output reception channel on the uplink, respective ones of in-phase and quadrature baseband receive samples are coupled from a respective one of the plurality of transceiver devices to the corresponding cable to be sent to the central processor subsystem. In one example, the wideband MIMO transmission channel and the wideband MIMO reception channel comprise a 160 MHz and 80+80 MHz transmission channel and reception channel using two transceiver devices each having four antennas and handling 4*80 MHz of traffic.

As described above, in one embodiment, the distributing may involve dividing the in-phase and quadrature baseband samples based on at least one of: frequency band, transceiver chains of the respective transceiver devices and subbands within a frequency band, across the plurality of transceiver devices. In another embodiment, the distributing may involve dividing the in-phase and quadrature baseband samples for at least a first frequency band and a second frequency band to produce first baseband transmit and receive signals associated with traffic for the first frequency band and second baseband transmit and receive signals associated with traffic for the second frequency band, and wherein coupling comprises coupling the first baseband transmit and receive signals for the first frequency band to a first cable that is connected between the central processor subsystem and a first transceiver device of the plurality of transceiver devices and coupling the second baseband transmit and receive signals for the second frequency band to a second cable that is connected between the central processor subsystem a second transceiver device of the plurality of transceiver devices. In still another embodiment, distributing involves dividing the in-phase and quadrature baseband transmit samples by transceiver chains across the plurality of transceiver devices to produce transceiver chain-specific baseband transmit signals, and wherein coupling involves coupling respective transceiver chain-specific baseband transmit signals to a corresponding cable for a corresponding transceiver chain. In yet another embodiment, the distributing involves dividing the in-phase and quadrature baseband samples based on a combination of frequency band and transceiver chains across the plurality of transceiver devices to produce transceiver chain-specific signals for each frequency band, and coupling involves coupling via a respective transceiver chain-specific signals for one or more transceiver chains for a particular frequency band. In another embodiment, the distributing involves dividing the in-phase and quadrature baseband samples based on a combination of frequency band, transceiver chains and subbands within a frequency band, to produce transceiver chain-specific signals for one or more particular subbands of each of one or more frequency bands, and the coupling involves coupling via a respective cable transceiver chain-specific signals for one or more transceiver chains for each of one or more subbands for each frequency band.

In still another embodiment, distributing involves dividing the in-phase and quadrature baseband transmit samples by subbands of a frequency band to produce a plurality subband-specific baseband transmit signals, and coupling comprises coupling respective subband-specific baseband transmit signals to a corresponding cable for a respective one of the plurality of transceiver devices. In still another embodiment, the distributing involves dividing the in-phase and quadrature baseband transmit samples using one of: dividing by subcarriers, filtering in a linear domain, and filtering in a power domain.

In summary, a system and method are presented herein whereby an access point is "split" into radio transceiver devices, each with its own cable connecting it to a central processor. The IQ samples are split by one or more of frequency band, antennas and subbands across each radio transceiver device. This is especially useful for IEEE 802.11ac 160 MHz and 80+80 MHz systems. This is particularly useful when limited to 1 GigE cables and components.

In one form, a method is provided that is performed at a wireless access point device that wirelessly communicates with a plurality of wireless client devices, the wireless access point including a central processor subsystem and a plurality of transceiver devices each including a plurality of antennas and a plurality of radio transceivers, each of the plurality of transceiver devices for deployment throughout a coverage area and being connected to the central processor subsystem via a respective cable. The method includes the central processor subsystem distributing in-phase and quadrature baseband samples across the plurality of transceiver devices associated with traffic to be transmitted and received via the plurality of transceiver devices in one or more frequency bands so as to synthesize a wideband multiple-input multiple-output transmission (MIMO) channel and a wideband MIMO reception channel; and coupling respective ones of in-phase and quadrature baseband transmit samples from the central processor subsystem to a corresponding cable to be sent to a corresponding one of the plurality of transceiver devices for wireless transmission via the plurality of antennas of each of the plurality of transceiver devices, and respective ones of in-phase and quadrature baseband receive samples from a respective one of the plurality of transceiver devices to the corresponding cable to be sent to the central processor subsystem.

In another form, a system is provided comprising: a plurality of transceiver devices each including a plurality of antennas and a plurality of radio transceivers, each of the plurality of transceiver devices for deployment throughout a coverage area; and a central processor subsystem connected to the plurality of transceiver devices, the central processor subsystem configured to: distribute in-phase and quadrature baseband samples across the plurality of transceiver devices associated with traffic to be transmitted and received via the plurality of transceiver devices in one or more frequency bands so as to synthesize a wideband multiple-input multiple-output transmission channel and a wideband multiple-input multiple-output reception channel; couple respective ones of in-phase and quadrature baseband transmit samples from the central processor subsystem to a corresponding cable to be sent to a corresponding one of the plurality of transceiver devices for wireless transmission via the plurality of antennas of each of the plurality of transceiver devices; and receive respective ones of in-phase and quadrature baseband receive samples from a respective one of the plurality of transceiver devices via a corresponding cable.

In yet another form, an apparatus is provided comprising: a plurality of baseband modulators; a plurality of baseband demodulators; a communication interface configured to enable communication, by one or more cables, with a plurality of transceiver devices each including a plurality of antennas a plurality of radio transceivers; a control processor coupled to the plurality of baseband modulators, the plurality of baseband demodulators and the communication interface, wherein the control processor is configured to: distribute in-phase and quadrature baseband samples across the plurality of transceiver devices associated with traffic to be transmitted and received via the plurality of transceiver devices in one or more frequency bands so as to synthesize a wideband multiple-input multiple-output transmission channel and a wideband multiple-input multiple-output reception channel; couple respective ones of in-phase and quadrature baseband transmit samples from the central processor subsystem to a corresponding cable to be sent to a corresponding one of the plurality of transceiver devices for wireless transmission via the plurality of antennas of each of the plurality of transceiver devices; and receive respective ones of in-phase and quadrature baseband receive samples from a respective one of the plurality of transceiver devices via a corresponding cable.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method performed at a wireless access point device that wirelessly communicates with a plurality of wireless client devices, the wireless access point device including a central processor subsystem and a plurality of transceiver devices connected to the central processor subsystem via a respective plurality of cables for deployment throughout a coverage area, each of the plurality of transceiver devices including a plurality of antennas and a plurality of radio transceivers, the method comprising:
the central processor subsystem dividing in-phase and quadrature baseband transmit and receive samples across the plurality of transceiver devices associated with traffic to be transmitted and received via the plurality of transceiver devices in one or more frequency bands so as to synthesize a wideband multiple-input multiple-output (MIMO) transmission channel and a wideband MIMO reception channel;
transmitting respective ones of in-phase and quadrature baseband transmit samples from the central processor subsystem to each of a number of the plurality of transceiver devices via corresponding ones of the respective plurality of cables, wherein the in-phase and quadrature baseband transmit samples are each to be sent to a corresponding one of the number of the plurality of transceiver devices for wireless transmission via the plurality of antennas of each of the number of the plurality of transceiver devices; and
receiving at least one in-phase and quadrature baseband receive sample from a respective one of the plurality of transceiver devices via a corresponding one of the respective plurality of cables connecting the respective one of the plurality of transceiver devices to the central processor subsystem.

2. The method of claim 1, further comprising the central processor subsystem compressing the in-phase and quadrature baseband transmit samples prior to transmitting via the corresponding ones of the respective plurality of cables.

3. The method of claim 1, wherein dividing comprises dividing the in-phase and quadrature baseband samples based on at least one of: frequency band, transceiver chains of the respective transceiver devices and subbands within a frequency band, across the plurality of transceiver devices.

4. The method of claim 3, wherein dividing comprises dividing the in-phase and quadrature baseband samples for at least a first frequency band and a second frequency band to produce first baseband transmit and receive signals associated with traffic for the first frequency band and second baseband transmit and receive signals associated with traffic for the second frequency band, and wherein transmitting comprises transmitting the first baseband transmit and receive signals for the first frequency band to a first transceiver device of the plurality of transceiver devices via a first cable of the respective plurality of cables that is connected between the central processor subsystem and the first transceiver device of the plurality of transceiver devices and transmitting the second baseband transmit and receive signals for the second frequency band to a second transceiver device of the plurality of transceiver devices via a second cable of the respective plurality of cables that is connected between the central processor subsystem and the second transceiver device of the plurality of transceiver devices.

5. The method of claim 3, wherein dividing comprises dividing the in-phase and quadrature baseband transmit samples by transceiver chains across the plurality of transceiver devices to produce transceiver chain-specific baseband transmit signals, and wherein transmitting comprises transmitting respective transceiver chain-specific baseband transmit signals via a corresponding one of the respective plurality of cables for a corresponding transceiver chain.

6. The method of claim 3, wherein dividing comprises dividing the in-phase and quadrature baseband transmit samples by subbands of a frequency band to produce a plurality subband-specific baseband transmit signals, and transmitting comprises transmitting respective subband-specific baseband transmit signals via a corresponding one of the respective plurality of cables for a respective one of the plurality of transceiver devices.

7. The method of claim 6, wherein dividing comprises dividing the in-phase and quadrature baseband transmit samples using one of: dividing by subcarriers, filtering in a linear domain, and filtering in a power domain.

8. The method of claim 7, wherein the wideband MIMO transmission channel and the wideband MIMO reception channel comprise a 160 MHz and 80+80 MHz transmission channel and reception channel using two transceiver devices each having four antennas and handling 4*80 MHz of traffic.

9. The method of claim 3, further comprising using selection diversity across the plurality of transceiver devices to determine on which transceiver chain to transmit for a given subband.

10. The method of claim 9, further comprising selecting one or more transceiver chains for an entire frequency band and using selection diversity on all other transceiver chains so that a full bandwidth of a frequency band is used for at least one transceiver chain for at least one transceiver device.

11. The method of claim 3, further comprising sending channel state information for all or a subset of all antennas of a given transceiver device or all or a subset of all transceiver chains to the central processor subsystem even if a current received packet is being decoded using a subset of all the transceiver chains.

12. The method of claim 3, wherein dividing comprises dividing the in-phase and quadrature baseband samples based on a combination of frequency band and transceiver chains across the plurality of transceiver devices to produce transceiver chain-specific signals for each frequency band, and transmitting comprises transmitting via a respective cable of the respective plurality of cables transceiver chain-specific signals for one or more transceiver chains for a particular frequency band.

13. The method of claim 3, wherein dividing comprises dividing the in-phase and quadrature baseband samples based on a combination of frequency band, transceiver chains and subbands within a frequency band, to produce transceiver chain-specific signals for one or more particular subbands of each of one or more frequency bands, and transmitting comprises transmitting via a respective cable of the respective plurality of cables transceiver chain-specific signals for one or more transceiver chains for each of one or more subbands for each frequency band.

14. A system comprising:
a plurality of transceiver devices each including a plurality of antennas and a plurality of radio transceivers, each of the plurality of transceiver devices for deployment throughout a coverage area; and
a central processor subsystem connected to the plurality of transceiver devices via a respective plurality of cables, the central processor subsystem configured to:
divide in-phase and quadrature baseband transmit and receive samples across the plurality of transceiver devices associated with traffic to be transmitted and received via the plurality of transceiver devices in one or more frequency bands so as to synthesize a wideband multiple-input multiple-output transmission channel and a wideband multiple-input multiple-output reception channel;
transmit respective ones of in-phase and quadrature baseband transmit samples from the central processor subsystem to each of a number of the plurality of transceiver devices via corresponding ones of the respective plurality of cables, wherein the in-phase and quadrature baseband transmit samples are each to be sent to a corresponding one of the number of the plurality of transceiver devices for wireless transmission via the plurality of antennas of each of the number of the plurality of transceiver devices; and
receive at least one in-phase and quadrature baseband receive sample from a respective one of the plurality of transceiver devices via a corresponding one of the respective plurality of cables.

15. The system of claim 14, wherein the central processor subsystem is configured to compress the in-phase and quadrature baseband transmit samples prior to transmitting via the corresponding ones of the respective plurality of cables.

16. The system of claim 14, wherein the central processor subsystem is configured to divide the in-phase and quadrature baseband samples based on at least one of: frequency band, antenna paths of the respective transceiver devices and subbands within a frequency band, across the plurality of transceiver devices, to produce a plurality of partitioned baseband signals.

17. The system of claim 16, wherein the central processor subsystem is configured to use selection diversity across the plurality of transceiver devices to determine on which transceiver chain to transmit for a given subband.

18. An apparatus comprising:
a plurality of baseband modulators;
a plurality of baseband demodulators;
a communication interface configured to enable communication with a plurality of transceiver devices each including a plurality of antennas and a plurality of radio transceivers, wherein the communication interface is configured to connect to the plurality of transceiver devices via a respective plurality of cables;
a control processor coupled to the plurality of baseband modulators, the plurality of baseband demodulators and the communication interface, wherein the control processor is configured to:
divide in-phase and quadrature baseband transmit and receive samples across the plurality of transceiver devices associated with traffic to be transmitted and received via the plurality of transceiver devices in one or more frequency bands so as to synthesize a wideband multiple-input multiple-output transmission channel and a wideband multiple-input multiple-output reception channel;
transmit sage respective ones of in-phase and quadrature baseband transmit samples from the central processor subsystem to each of a number of the plurality of transceiver devices via corresponding ones of the respective plurality of cables, wherein the in-phase and quadrature baseband transmit samples are each to be sent to a corresponding one of the number of the plurality of transceiver devices for wireless transmission via the plurality of antennas of each of the number of the plurality of transceiver devices; and
receive at least one in-phase and quadrature baseband receive sample from a respective one of the plurality of transceiver devices via a corresponding one of the respective plurality of cables.

19. The apparatus of claim 18, wherein the control processor is configured to cause the in-phase and quadrature baseband transmit samples to be compressed prior to transmitting via the corresponding ones of the respective plurality of cables.

20. The apparatus of claim 18, wherein the control processor is configured to divide the in-phase and quadrature baseband samples based on at least one of: frequency band, antenna paths of the respective transceiver devices and subbands within a frequency band, across the plurality of transceiver devices, to produce a plurality of partitioned baseband signals.

* * * * *

UNITED STATES PATENT AND TRADEMARK OFFICE
CERTIFICATE OF CORRECTION

PATENT NO. : 10,312,979 B2
APPLICATION NO. : 15/220701
DATED : June 4, 2019
INVENTOR(S) : Brian D. Hart et al.

Page 1 of 1

It is certified that error appears in the above-identified patent and that said Letters Patent is hereby corrected as shown below:

In the Claims

Claim 18, Column 12, Line 35, please replace "transmit sage respective" with --transmit respective--

Signed and Sealed this
Thirtieth Day of July, 2019

Andrei Iancu
*Director of the United States Patent and Trademark Office*